(12) United States Patent
Chmylkowski

(10) Patent No.: US 10,487,917 B2
(45) Date of Patent: Nov. 26, 2019

(54) GEARED GAS TURBINE ENGINE

(71) Applicant: ROLLS-ROYCE plc, London (GB)

(72) Inventor: Pawel B Chmylkowski, Derby (GB)

(73) Assignee: ROLLS-ROYCE plc, London (GB)

(*) Notice: Subject to any disclaimer, the term of this patent is extended or adjusted under 35 U.S.C. 154(b) by 615 days.

(21) Appl. No.: 15/271,809

(22) Filed: Sep. 21, 2016

(65) Prior Publication Data

US 2017/0108084 A1 Apr. 20, 2017

(30) Foreign Application Priority Data

Oct. 15, 2015 (GB) .................................. 1518227.2

(51) Int. Cl.
*F16H 1/34* (2006.01)
*F01D 15/12* (2006.01)
(Continued)

(52) U.S. Cl.
CPC .............. *F16H 1/34* (2013.01); *F01D 15/12* (2013.01); *F02C 7/36* (2013.01); *F04D 29/053* (2013.01);
(Continued)

(58) Field of Classification Search
CPC . F16H 1/34; F16H 1/28; F16H 1/2818; F16H 57/08; F04D 29/053; F01D 15/12;
(Continued)

(56) References Cited

U.S. PATENT DOCUMENTS

| 7,704,178 B2 | 4/2010 | Sheridan et al. |
| 8,439,637 B2 * | 5/2013 | DiBenedetto ........... F02C 3/107 415/229 |

(Continued)

FOREIGN PATENT DOCUMENTS

| DE | 1922417 A1 * | 11/1970 | ............... F16H 1/28 |
| DE | 1922417 A1 | 11/1970 | |

(Continued)

OTHER PUBLICATIONS

Wilfert, Aero-Engine Design: From State of the Art Turbofans Towards Innovative Architectures, 2008, von Karman Institute for Fluid Dynamics (Year: 2008).*

(Continued)

*Primary Examiner* — Eldon T Brockman
(74) *Attorney, Agent, or Firm* — Oliff PLC

(57) ABSTRACT

A gas turbine engine comprises a gearbox comprising a sun gear, an annulus gear, a plurality of planet gears and a carrier. Each planet gear is rotatably mounted in the carrier by a bearing. The sun gear meshes with the planet gears and the planet gears mesh with the annulus gear. The sun gear, the planet gears and the annulus gear comprise helical gear teeth. The annulus gear is secured to a surrounding structure by a radially extending member. A face of the flange nearest the middle of the annulus gear is axially spaced from the middle of the annulus gear by a first distance. The reference diameter of the annulus gear is radially spaced from a point at which the radially extending member is secured to the surrounding structure by a second distance. The ratio of first distance to second distance is between and including 0.5 and 1.2 such that misalignment between the annulus gear and the planet gears is reduced to minimise vibrations, noise, stress and wear of the gearbox.

20 Claims, 6 Drawing Sheets

(51) Int. Cl.
*F02C 7/36* (2006.01)
*F04D 29/053* (2006.01)
*F16H 1/28* (2006.01)
*F16H 57/08* (2006.01)

(52) U.S. Cl.
CPC ............... *F16H 1/28* (2013.01); *F16H 57/08* (2013.01); *F05D 2220/32* (2013.01); *F05D 2260/40311* (2013.01)

(58) Field of Classification Search
CPC ............. F02C 7/36; F05D 2260/40311; F05D 2220/32
See application file for complete search history.

(56) References Cited

U.S. PATENT DOCUMENTS

| | | | | |
|---|---|---|---|---|
| 8,672,801 | B2* | 3/2014 | McCune | F01D 25/164 475/346 |
| 8,968,148 | B2* | 3/2015 | Matsuoka | F16H 1/2818 475/331 |
| 8,986,146 | B2* | 3/2015 | Gallet | F02C 3/107 475/96 |
| 2008/0006018 | A1* | 1/2008 | Sheridan | F01D 25/18 60/39.1 |
| 2011/0123326 | A1 | 5/2011 | DiBenedetto et al. | |
| 2011/0130246 | A1 | 6/2011 | McCune et al. | |
| 2013/0310213 | A1 | 11/2013 | Matsuoka et al. | |
| 2013/0324343 | A1 | 12/2013 | Gallet | |

FOREIGN PATENT DOCUMENTS

| | | |
|---|---|---|
| GB | 734223 A | 7/1955 |
| GB | 1 363 151 A | 8/1974 |
| WO | 03/039900 A1 | 5/2003 |
| WO | 2014/182467 A1 | 11/2014 |

OTHER PUBLICATIONS

Apr. 12, 2016 Search Report issued in British Patent Application No. 1518227.2.

Mar. 7, 2017 Search Report issued in European Patent Application No. EP16189842.

* cited by examiner

GEARED GAS TURBINE ENGINE

The present disclosure concerns a geared gas turbine engine and in particular to a geared turbofan gas turbine engine or a geared turbo propeller gas turbine engine.

A geared turbofan gas turbine engine or a geared turbo propeller gas turbine engine comprises a gearbox which is arranged to drive the fan or propeller. The gearbox comprises an annulus gear which is arranged to be static if the gearbox is a planetary gearbox. The gearbox comprises an annulus gear which is arranged to rotate if the gearbox is a star gearbox or a differential gearbox. The annulus gear is either secured to a static structure, or to an output drive shaft, by a bolted flange and the flange is located in the middle of the annulus gear.

A problem with this arrangement is that if the annulus gear comprises a helical gear, or a double helical gear, the location of the flange in the middle of the annulus gear causes mesh misalignment between the annulus gear and the planet gears due to the axial mesh force component.

It is known to minimise the detrimental misalignment of the annulus gear and the planet gears by micro-geometry correction of the tooth flanks. The micro-geometry correction is optimised for one operating condition only and at other operating conditions the mesh between the annulus gear and the planet gears suffers from off-design mesh contact conditions with increased transmission error producing noise, vibration, increased stress, increased wear etc. in the gearbox and reduced gearbox efficiency.

The present disclosure seeks to provide a geared gas turbine engine which reduces or overcomes this problem.

According to a first aspect of the present disclosure there is provided a gas turbine engine comprising a gearbox, the gearbox comprising a sun gear, an annulus gear, a plurality of planet gears and a carrier, each planet gear being rotatably mounted in the carrier by at least one bearing, the sun gear meshing with the planet gears and the planet gears meshing with the annulus gear, the sun gear, the planet gears and the annulus gear comprising helical gear teeth, the annulus gear being secured to a surrounding structure by a radially extending member, a face of the radially extending member nearest the middle of the annulus gear being axially spaced from the middle of the annulus gear by a first distance, the reference diameter of the annulus gear being radially spaced from a point at which the radially extending member is secured to the surrounding structure by a second distance, wherein the ratio of first distance to second distance is between and including 0.5 and 1.2.

The ratio of first distance to second distance may be between and including 0.55 and 1.17. The ratio of first distance to second distance may be between and including 0.60 and 1.10.

According to a second aspect of the present disclosure there is provided a gas turbine engine comprising a gearbox, the gearbox comprising a sun gear, an annulus gear, a plurality of planet gears and a carrier, each planet gear being rotatably mounted in the carrier by at least one bearing, the sun gear meshing with the planet gears and the planet gears meshing with the annulus gear, the sun gear, the planet gears and the annulus gear comprising helical gear teeth, the helical gear teeth having a pressure angle and a helix angle, the annulus gear being secured to a surrounding structure by a radially extending member, a face of the radially extending member nearest the middle of the annulus gear being axially spaced from the middle of the annulus gear by a first distance, the reference diameter of the annulus gear being radially spaced from a point at which the radially extending member is secured to the surrounding structure by a second distance, wherein the first distance=(the second distance×sin (helix angle of the helical gear teeth))/tan (pressure angle of the helical gear teeth).

According to a third aspect of the disclosure there is provided a gearbox comprising a sun gear, an annulus gear, a plurality of planet gears and a carrier, each planet gear being rotatably mounted in the carrier by at least one bearing, the sun gear meshing with the planet gears and the planet gears meshing with the annulus gear, the sun gear, the planet gears and the annulus gear comprising helical gear teeth, the annulus gear being secured to a surrounding structure by a radially extending member, a face of the radially extending member nearest the middle of the annulus gear being axially spaced from the middle of the annulus gear by a first distance, the reference diameter of the annulus gear being radially spaced from a point at which the radially extending member is secured to the surrounding structure by a second distance, wherein the ratio of first distance to second distance is between and including 0.5 and 1.2.

The carrier may comprise a first ring, a second ring spaced axially from the first ring and a plurality of circumferentially spaced axles extending axially between the first ring and the second ring, each planet gear being rotatably mounted on a respective one of the axles.

Each planet gear may be rotatably mounted on the carrier by a journal bearing or at least one rolling element bearing.

Each planet gear may be rotatably mounted on the carrier by two rolling element bearings.

The carrier may be connected to an output shaft and the surrounding structure may be a static structure.

The carrier may be connected to static structure and the surrounding structure is an output shaft.

The carrier may be connected to an output shaft and the surrounding structure may be connected to an output shaft.

The radially extending member may be flange. The flange may be secured to the surrounding structure by a bolted connection. The flange may comprise a plurality of apertures for the bolts of the bolted connection, the axes of the apertures being arranged at a radial distance from the reference diameter of the annulus gear. The point at which the flange is secured to the surrounding structure is the radial distance from the reference diameter of the annulus gear to the axes of the apertures in the flange.

The gas turbine engine may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

The gas turbine engine may comprising a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

The gas turbine engine may comprise a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

The gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to drive the intermediate-pressure compressor and the low-pressure turbine is arranged to drive the first propulsor and the second propulsor via a gearbox.

The sun gear may be driven by the low-pressure turbine, the annulus gear may be secured to static structure and the carrier may be arranged to drive the propulsor.

The sun gear may be driven by the low-pressure turbine, the carrier may be secured to static structure and the annulus gear may be arranged to drive the propulsor.

The carrier may be driven by the low-pressure turbine, the sun gear may be secured to static structure and the annulus gear may be arranged to drive a propulsor.

The sun gear may be driven by the low-pressure turbine, the carrier may be arranged to drive a first propulsor and the annulus gear may be arranged to drive a second propulsor.

The propulsor may be a fan or a propeller.

The sun gear, the planet gears and the annulus gear may each comprise two sets of helical gear teeth.

Alternatively, the sun gear, the planet gears and the annulus gear may each comprise one set of helical gear teeth.

The skilled person will appreciate that except where mutually exclusive, a feature described in relation to any one of the above aspects of the invention may be applied mutatis mutandis to any other aspect of the invention.

Embodiments of the disclosure will now be described by way of example only, with reference to the Figures, in which.

Figure 1:
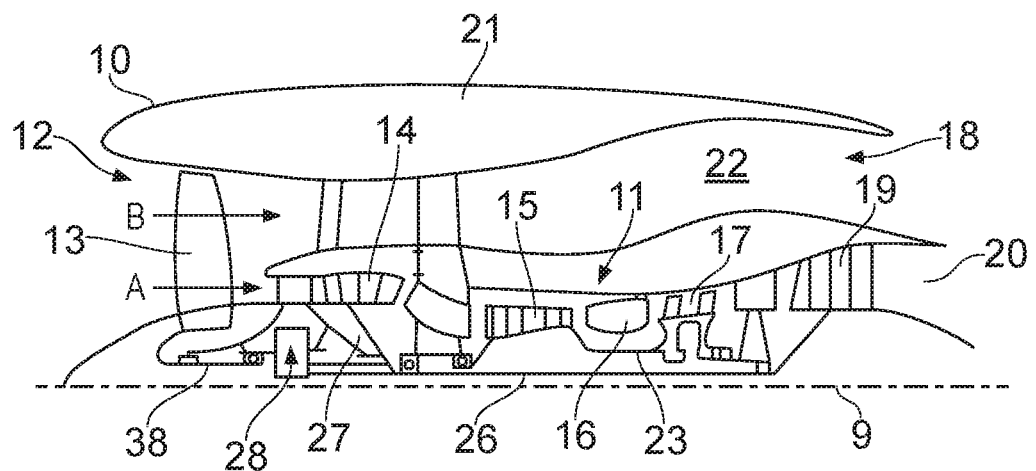
FIG. 1 is a part sectional side view of a geared turbofan gas turbine engine according to the present disclosure.
Figure 2:
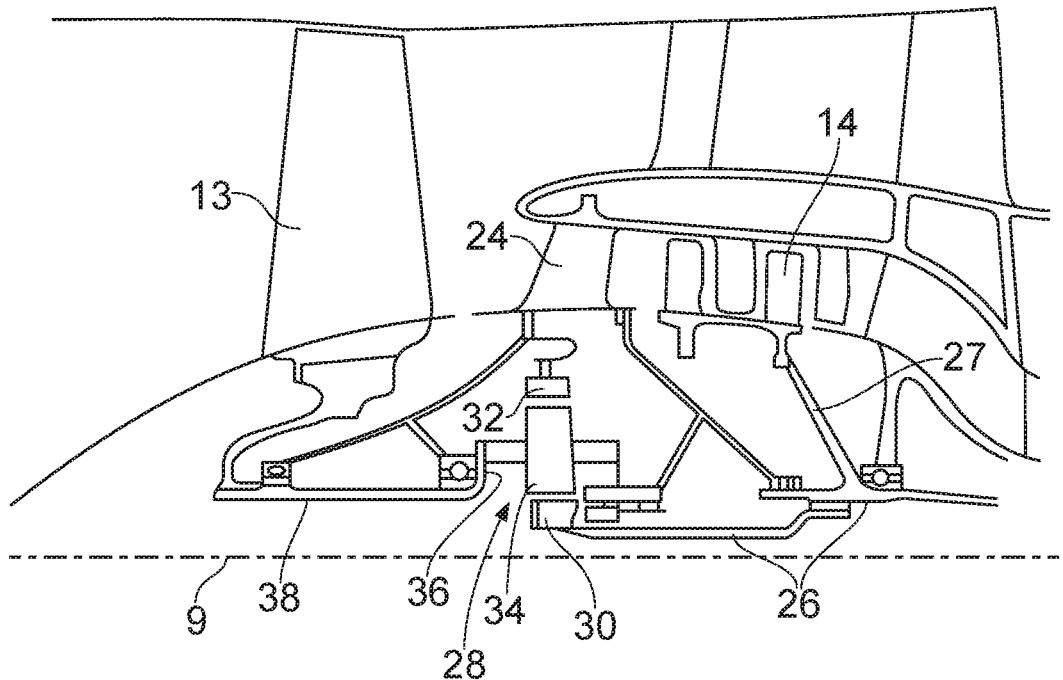
FIG. 2 is an enlarged part sectional side view of a portion of the geared turbofan gas turbine engine shown in FIG. 1.

With reference to FIGS. 1 and 2, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is compressed by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a shaft 23. The low-pressure turbine 19 drives the intermediate-pressure compressor 14 directly via shafts 26 and 27. The low-pressure turbine 19 drives the fan 13 indirectly via the shaft 26, a gearbox 28 and a shaft 38. The gearbox 28 comprises a sun gear 30, an annulus gear 32, a plurality of planet gears 34 and a carrier 36. The sun gear 30 meshes with the planet gears 34 and the planet gears 34 mesh with the annulus gear 32. The carrier 36 constrains the planet gears 34 to precess around the sun gear 30 in synchronicity whilst enabling each planet gear 34 to rotate about its own axis independently. The carrier 36 is coupled via the shaft 38 to the fan 13 in order to drive its rotation about the engine axis 9. The annulus gear 32 is coupled to a static structure 24. The axes of the planet gears 34 and the axis of the carrier 36 are parallel to the engine axis 9. The shaft 38 is rotatably mounted in static structure by one or more bearings, e.g. rolling element bearings, e.g. roller bearings or ball bearings.

Figure 3:
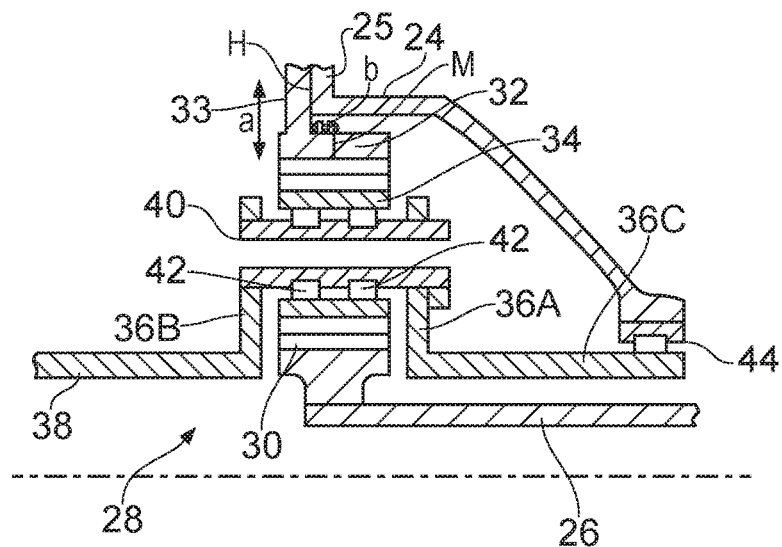
FIG. 3 is an enlarged cross-sectional view though the gearbox shown in FIG. 2.
Figure 4:
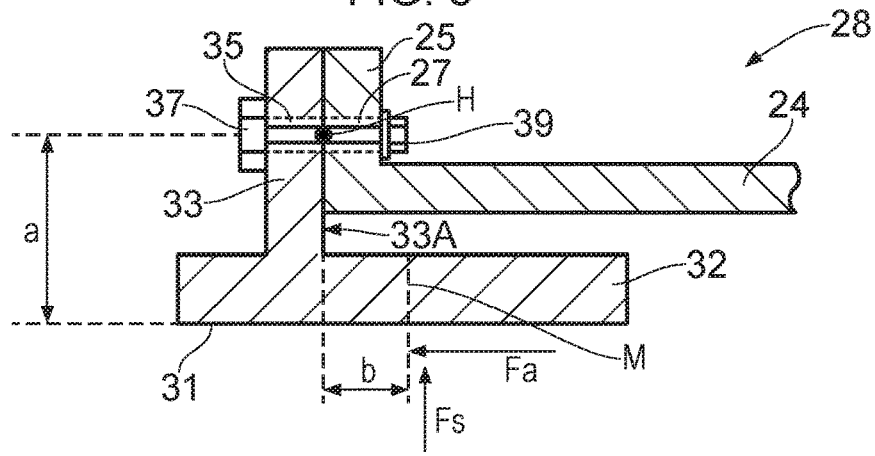
FIG. 4 is a further enlarged cross-sectional view of the annulus gear and surrounding structure of the gearbox shown in FIG. 3.

The gearbox 28 is shown more clearly in FIGS. 3 and 4 and the carrier 36 comprises a first ring 36A, a second ring 36B spaced axially from the first ring 36A and a plurality of circumferentially spaced axles, also known as pins, 40 which extend axially between the first ring 36A and the second ring 36B. Each planet gear 34 is rotatably mounted on a respective one of the axles 40 and an annular extension, e.g. an extension shaft, 36C extends axially from the first ring 36A. Each planet gear 34 is rotatably mounted in the carrier 36 by at least one bearing 42. The extension shaft 36C is rotatably mounted in the static structure 24 by a bearing, e.g. a rolling element bearing 44.

In this particular embodiment each planet gear 34 is rotatably mounted on the carrier 36 by two rolling element bearings e.g. two roller bearings or two ball bearings 42. Alternatively each planet gear 34 may be rotatably mounted on the carrier 36 by a single rolling element bearing, e.g. a single roller bearing or a single ball bearing, or a journal bearing.

The gearbox 28 shown in FIG. 3 is a planetary gearbox. The sun gear 30, the planet gears 34 and the annulus gear 32 each comprise single helical gear teeth. The annulus gear 32 is secured to a surrounding static structure 24 by a radially extending member 33. A face 33A of the radially extending member 33 nearest the axial mid position M of the annulus gear 32 is axially spaced from the middle, or axial mid position, M of the annulus gear 32 by a first distance "b", the reference diameter 31 of the annulus gear 32 is radially spaced from a point H at which the radially extending member 33 is secured to the surrounding static structure 24 by a second distance "a". The ratio of the first distance "b" to the second distance "a" is between and including 0.5 and 1.2. Preferably the ratio of the first distance "b" to the second distance "a" is between and including 0.51 and 1.19. Preferably the ratio of the first distance "b" to the second distance "a" is between and including 0.52 and 1.18. More preferably the ratio of the first distance "b" to the second distance "a" is between and including 0.53 and 1.17. More preferably the ratio of the first distance "b" to the second distance "a" is between and including 0.55 and 1.17. The ratio of the first distance "b" to the second distance "a" may be between and including 0.60 and 1.10. The reference diameter D as is well known to those skilled in the art is a basic parameter of any gearbox design and is a function of the number of teeth and their size. The reference diameter D is determined by the formula:—

$$D = zm_t = zm_n / \cos \beta,$$

where z is the number of gear teeth, $m_t$ is transverse gear module, $m_n$ is normal gear module and $\beta$ is the helix angle at the reference diameter.

The radially extending member 33 is a flange in this example. The flange 33 is secured to the surrounding static structure 24 by a bolted connection. The flange 33 comprises a plurality of apertures 35 for bolts 37 of the bolted connection. The axes of the apertures 35 are arranged at a radial distance "a" from the reference diameter 31 of the annulus gear 32. The point H at which the flange 33 is secured to the surrounding static structure 24 is the radial distance "a" from the reference diameter 31 of the annulus gear 32 to the axes of the apertures 35 in the flange 33. The bolts 37 extend through corresponding apertures 27 in a flange 25 on the static structure 24 and are threaded into respective nuts 39.

FIG. 4 also shows the axial mesh force $F_a$ and the separation force $F_s$ acting on the helix for an assumed helix hand and these forces are related by the helix angle and the pressure angle of the helical teeth. The present disclosure positions the radially extending member of the annulus gear such that the moments created by the axial force $F_a$ and the separation force $F_s$ are balanced at the point H, a designed hinge point of the annulus gear 32. As a result of this the misalignment between the annulus gear 32 and the planet gears 34 in the radial-axial plane is reduced. Thus, the present disclosure reduces vibration, noise, stress and wear of the gearbox.

An equation defining the position of the flange is "b"= ("a"×sin HA)/tan PA, where HA is the helical angle of the helical teeth and PA is the pressure angle of the helical teeth. The helical angle of the helical teeth and the pressure angle of the helical teeth are well known to a person skilled in the art.

In the case of a gearbox with helical gear teeth, the pressure angles are between and including 20° and 25° and the helix angles are between and including 15° to 25°. Table 1, below, shows the ratio of "b"/"a" for different combinations of pressure angle and helix angle.

TABLE 1

| b/a | | Pressure angle [deg] | | |
|---|---|---|---|---|
| | | 20 | 22.5 | 25 |
| Helix angle [deg] | 15 | 0.711 | 0.625 | 0.555 |
| | 20 | 0.940 | 0.826 | 0.733 |
| | 25 | 1.161 | 1.020 | 0.906 |

Figure 5:
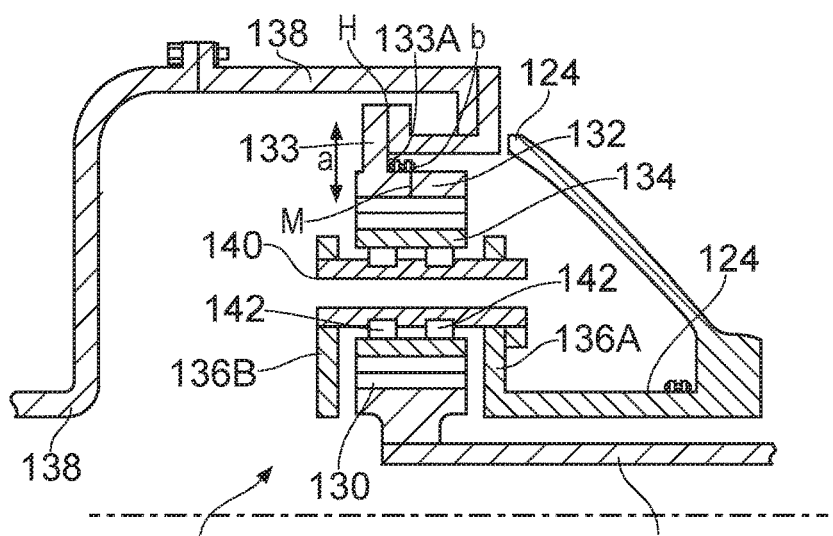
FIG. 5 is an enlarged cross-sectional view though an alternative gearbox according to the present disclosure.

FIG. 5 shows an arrangement in which the low-pressure turbine 19 drives the fan 13 indirectly via the shaft 126, a gearbox 128 and a shaft 138. The gearbox 128 comprises a sun gear 130, an annulus gear 132, a plurality of planet gears 134 and a carrier 136. The sun gear 130 meshes with the planet gears 134 and the planet gears 134 mesh with the annulus gear 132. The carrier 136 enabling each planet gear 134 to rotate about its own axis independently. The gearbox 128 shown in FIG. 5 is a star gearbox in which the planet gears 134 are sometimes known as star gears. The carrier 136 is coupled to a static structure 124. The annulus gear 132 is coupled via the shaft 138 to the fan 13 in order to drive its rotation about the engine axis 9. The axes of the planet gears 134 are parallel to the engine axis 9. The shaft 138 is rotatably mounted in static structure by one or more bearings, e.g. rolling element bearings, e.g. roller bearings or ball bearings. The carrier 136 comprises a first ring 136A, a second ring 136B spaced axially from the first ring 136A and a plurality of circumferentially spaced axles, also known as pins, 140 which extend axially between the first ring 136A and the second ring 136B. Each planet gear 134 is rotatably mounted on a respective one of the axles 140. Each planet gear 134 is rotatably mounted in the carrier 136 by at least one bearing 142. In this particular embodiment each planet gear 134 is rotatably mounted on the carrier 136 by two rolling element bearings e.g. two roller bearings or two ball bearings 142. Alternatively each planet gear 134 may be rotatably mounted on the carrier 136 by a single rolling element bearing, e.g. a single roller bearing or a single ball bearing, or a journal bearing. Alternatively, the carrier 136 comprises the second ring 136B and the axles 140, and the axles 140 extend axially between the second ring 1366 and the static structure 124.

The sun gear 130, the planet gears 134 and the annulus gear 132 also comprise single helical gear teeth. The annulus gear 132 is secured to a surrounding shaft 138 by a radially extending member 133. A face 133A of the radially extending member 133 nearest the axial mid position M of the annulus gear 132 is axially spaced from the middle, or axial mid position, M of the annulus gear 132 by a first distance "b", the reference diameter 131 of the annulus gear 132 is radially spaced from a point H at which the radially extending member 133 is secured to the surrounding shaft 138 by a second distance "a". The ratio of the first distance "b" to the second distance "a" is between and including 0.5 and 1.2 as disclosed with respect to FIGS. 3 and 4. Preferably the ratio of the first distance "b" to the second distance "a" is between and including 0.51 and 1.19. Preferably the ratio of the first distance "b" to the second distance "a" is between and including 0.52 and 1.18. More preferably the ratio of the first distance "b" to the second distance "a" is between and including 0.53 and 1.17. More preferably the ratio of the first distance "b" to the second distance "a" is between and including 0.55 and 1.17. The ratio of the first distance "b" to the second distance "a" may be between and including 0.60 and 1.10.

Figure 6:
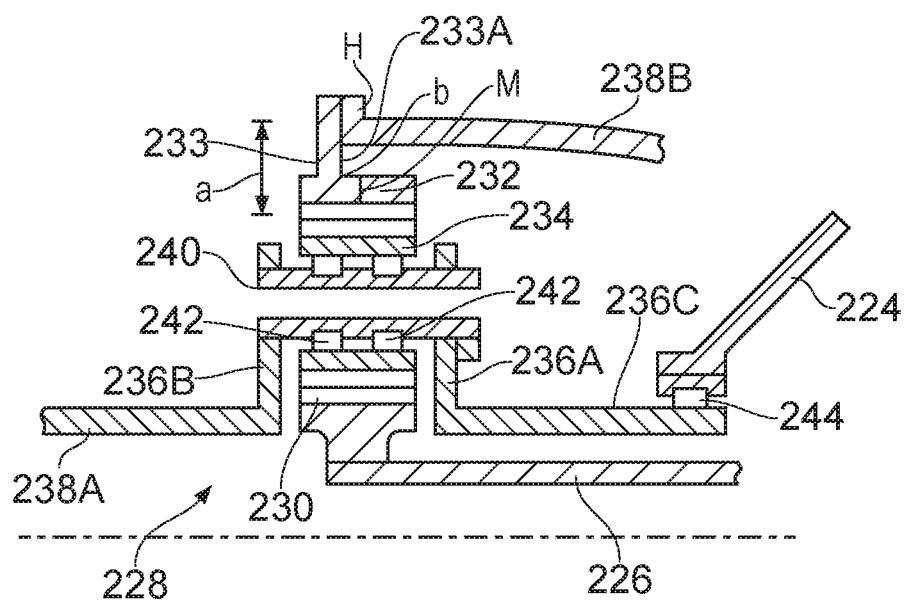
FIG. 6 is an enlarged cross-sectional view though a further gearbox according to the present disclosure.

FIG. 6 shows an arrangement in which the low-pressure turbine 19 drives two fans indirectly via the shaft 226, a gearbox 228 and shafts 238A and 238B. The gearbox 228 comprises a sun gear 230, an annulus gear 232, a plurality of planet gears 234 and a carrier 236. The sun gear 230 meshes with the planet gears 234 and the planet gears 234 mesh with the annulus gear 232. The carrier 236 enabling each planet gear 234 to rotate about its own axis independently. The gearbox 228 shown in FIG. 6 is a differential gearbox. The carrier 236 is coupled via the shaft 238A to a first propulsor (not shown) and the annulus gear 232 is coupled via the shaft 238B to a second propulsor (not shown) in order to drive their rotation about the engine axis 9. The shafts 238A and 238B are each rotatably mounted in static structure by one or more bearings, e.g. rolling element bearings, e.g. roller bearings or ball bearings. The propulsors are driven to rotate in opposite rotational directions. The axes of the planet gears 234 are parallel to the engine axis 9. The carrier 236 comprises a first ring 236A, a second ring 236B spaced axially from the first ring 236A and a plurality of circumferentially spaced axles 240 which extend axially between the first ring 236A and the second ring 236B. Each planet gear 234 is rotatably mounted on a respective one of the axles 240 and an annular extension 236C extends axially from the first ring 236A. Each planet gear 234 is rotatably mounted in the carrier 236 by at least one bearing 242. The annular extension 236C is rotatably mounted in the static structure 224 by a bearing 244. In this particular embodiment each planet gear 234 is rotatably mounted on the carrier 236 by two roller bearings 242. Alternatively each planet gear 234 may be rotatably mounted on the carrier 236 by a journal bearing.

The sun gear 230, the planet gears 234 and the annulus gear 232 also comprise single helical gear teeth. The annulus gear 232 is secured to a surrounding shaft 238B by a radially extending member 233. A face 133A of the radially extending member 233 nearest the axial mid position M of the annulus gear 232 is axially spaced from the middle, or axial mid position, M of the annulus gear 232 by a first distance "b", the reference diameter 231 of the annulus gear 232 is radially spaced from a point H at which the radially extending member 233 is secured to the surrounding shaft 138 by a second distance "a". The ratio of the first distance "b" to the second distance "a" is between and including 0.5 and 1.2 as disclosed with respect to FIGS. 3 and 4. Preferably the ratio of the first distance "b" to the second distance "a" is between and including 0.51 and 1.19. Preferably the ratio of the first distance "b" to the second distance "a" is between and including 0.52 and 1.18. More preferably the ratio of the first distance "b" to the second distance "a" is between and including 0.53 and 1.17. More preferably the ratio of the first distance "b" to the second distance "a" is between and including 0.55 and 1.17. The ratio of the first distance "b" to the second distance "a" may be between and including 0.60 and 1.10.

Figure 7:
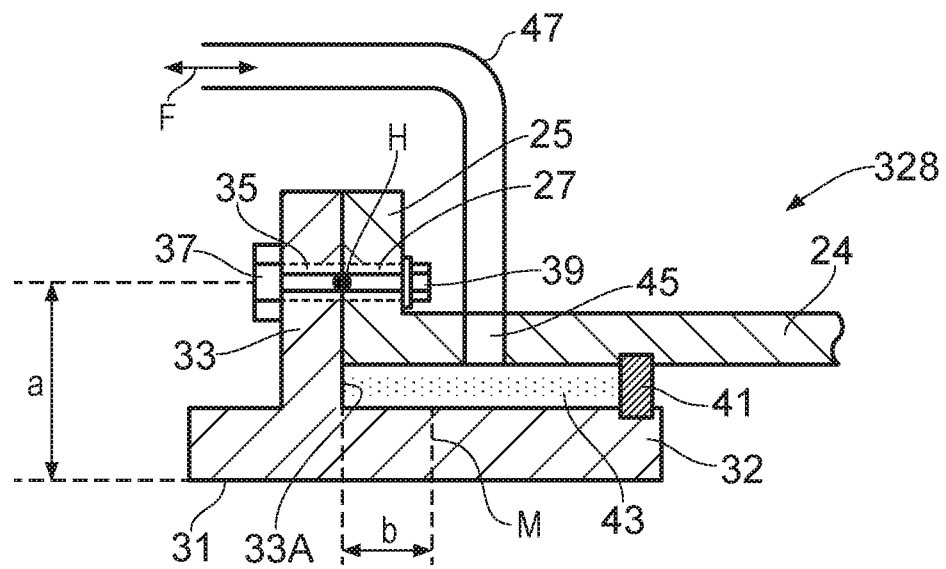
FIG. 7 is a further enlarged cross-sectional view of an alternative annulus gear and surrounding structure of the gearbox shown in FIG. 2.

FIG. 7 shows a gearbox 328 similar to that shown in FIG. 4 and like parts are denoted by like numerals. FIG. 7 differs in that a radially extending seal 41 is provided between the surrounding static structure 24 and the annulus gear 32. The seal 41 together with the radially outer surface of the annulus gear 42, the radially extending member, flange, 33 and the radially inner surface of the surrounding static structure 24 define an annular chamber 43. The surrounding static structure 24 has an aperture 45 extending there-through to the annular chamber 43 and a pipe 47 is arranged to supply fluid F into the annular chamber 43 through the aperture 45. The fluid F in the annular chamber 42 provides vibration damping for the annulus gear 32. Any mode of vibration in the annulus gear 32 produces a variation in the radial gap between the radially outer surface of the annulus gear 32 and the radially inner surface of the surrounding static structure 24 and hence imparts work on the fluid F present in the annular chamber 43. The vibration damping of the annulus gear 32 reduces the amplitude of vibration of the annulus gear 32 and hence reduces transmission errors, noise and stresses and may enable the thickness and weight of the annulus gear to be reduced. The annular chamber 43 and the contained fluid F form a vibration damping device, which may also operate with or without the seal and with or without an external supply of fluid. The fluid may be any suitable fluid for example gearbox lubricant.

The damping device(s) described with reference to FIG. 7 may be used in the gearbox arrangements described with reference to FIGS. 5 and 6.

As an alternative the annular chamber 43 may contain a solid vibration damping medium, for example an elastomeric material, e.g. natural rubber.

Figure 8:
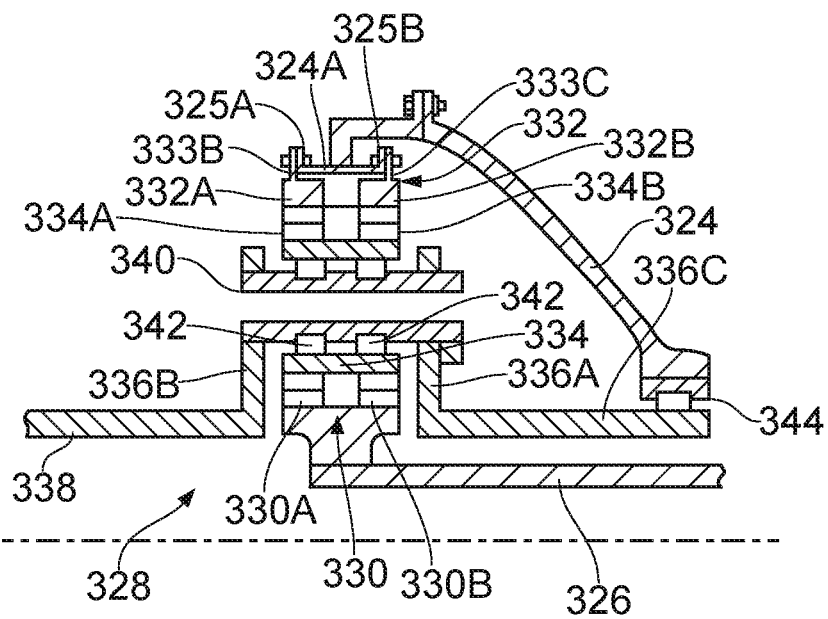
FIG. 8 is a further enlarged cross-sectional view of the annulus gear and surrounding structure of the gearbox shown in FIG. 2.
Figure 11:
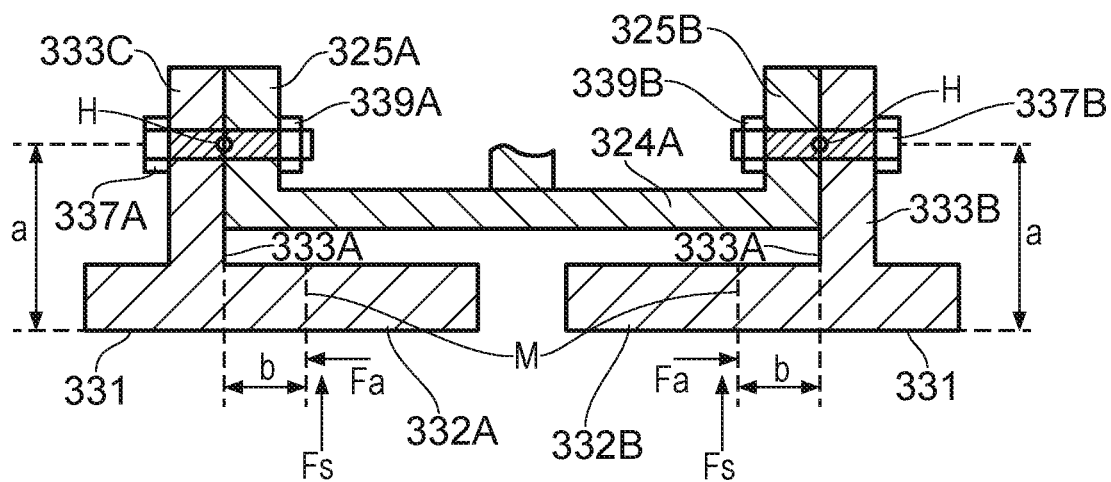
FIG. 11 is a further enlarged cross-sectional view of the annulus gear and surrounding structure of the gearbox shown in FIGS. 8, 9 and 10.

FIGS. 8 and 11, which are similar to FIGS. 3 and 4, also shows an arrangement in which the low-pressure turbine 19 drives the fan 13 indirectly via the shaft 326, a gearbox 328 and a shaft 338. The gearbox 328 comprises a sun gear 330, an annulus gear 332, a plurality of planet gears 334 and a carrier 336. The sun gear 330 meshes with the planet gears 334 and the planet gears 334 mesh with the annulus gear 332. The carrier 336 constrains the planet gears 334 to precess around the sun gear 30 in synchronicity whilst enabling each planet gear 334 to rotate about its own axis independently. The gearbox 328 shown in FIG. 8 is a planetary gearbox. The carrier 336 is coupled via the shaft 338 to the fan 13 in order to drive its rotation about the engine axis 9. The annulus gear 332 is coupled to a static structure 324. The axes of the planet gears 334 and the axis of the carrier 336 are parallel to the engine axis 9. The shaft 38 is rotatably mounted in static structure by one or more bearings, e.g. rolling element bearings, e.g. roller bearings or ball bearings. The carrier 336 comprises a first ring 336A, a second ring 336B spaced axially from the first ring 336A and a plurality of circumferentially spaced axles, also known as pins, 340 which extend axially between the first ring 336A and the second ring 336B. Each planet gear 334 is rotatably mounted on a respective one of the axles 340 and an annular extension, e.g. an extension shaft, 336C extends axially from the first ring 336A. Each planet gear 334 is rotatably mounted in the carrier 336 by at least one bearing 342. The extension shaft 336C is rotatably mounted in the static structure 324 by a bearing, e.g. a rolling element bearing 344. In this particular embodiment each planet gear 34 is rotatably mounted on the carrier 336 by two rolling element bearings e.g. two roller bearings or two ball bearings 342. Alternatively each planet gear 334 may be rotatably mounted on the carrier 336 by a single rolling element bearing, e.g. a single roller bearing or a single ball bearing, or a journal bearing.

The sun gear 330, the planet gears 334 and the annulus gear 332 are of the double helical design and have two sets of helical gear teeth, which are angled in opposite directions, e.g. a herringbone arrangement of helical gear teeth. The sun gear 330 comprises axially spaced sun gears 330A and 330B which have helical gear teeth angled in opposite directions. Each planet gear 334 comprises axially spaced planet gears 334A and 334B which have helical gear teeth angled in opposite directions. The annulus gear 332 comprises axially spaced annulus gears 332A and 332B which have helical gear teeth angled in opposite directions. The annulus gears 332A and 332B are arranged to be separate members arranged to be connected, or disconnected, from each other to enable the gearbox 328 to be assembled, or disassembled, by moving the annulus gears 332A and 332B axially in opposite directions while rotating the annulus gears 332A and 332B in opposite directions over the respective planet gears 334A and 334B.

The annulus gears 332A and 332B are secured to a surrounding static structure 324 by respective radially extending members 333C and 333B. A face 333A of the radially extending member 333C nearest the axial mid position M of the annulus gear 332A is axially spaced from the middle, or axial mid position, M of the annulus gear 332A by a first distance "b", the reference diameter 331 of the annulus gear 332A is radially spaced from a point H at which the radially extending member 333C is secured to the surrounding static structure 324 by a second distance "a". Similarly, a face 333A of the radially extending member 333B nearest the axial mid position M of the annulus gear 332B is axially spaced from the middle, or axial mid position, M of the annulus gear 332B by a first distance "b", the reference diameter 331 of the annulus gear 332B is radially spaced from a point H at which the radially extending member 333B is secured to the surrounding static structure 324 by a second distance "a". However, it is to be noted that the radially extending members 333C and 333B are axially spaced from their respective axial mid position M in opposite directions because the forces $F_a$ acting on the annulus gears 332A and 332B are in opposite axial directions. Thus the axial distance between the radially extending members 333C and 333B is greater than the axial distance between the axial mid positions M of the annulus gears 332A and 332B. The ratio of the first distance "b" to the second distance "a" is between and including 0.5 and 1.2. Preferably the ratio of the first distance "b" to the second distance "a" is between and including 0.51 and 1.19. Preferably the ratio of the first distance "b" to the second distance "a" is between and including 0.52 and 1.18. More preferably the ratio of the first distance "b" to the second distance "a" is between and including 0.53 and 1.17. More preferably the ratio of the first distance "b" to the second distance "a" is between and including 0.55 and 1.17. The ratio of the first distance "b" to the second distance "a" may be between and including 0.60 and 1.10. In addition the distances "a" and "b" for the annulus gear 332A are the same as the distances "a" and "b" for the annulus gear 332B.

The radially extending members 333C and 333B are flanges in this example. The flanges 333C and 333B are secured to an axially extending member, e.g. a cylindrical member, 324A of the surrounding static structure 324 by bolted connections. The flanges 333C and 33D each comprise a plurality of apertures for bolts 337A and 337B of the bolted connections. The axes of the apertures are arranged at a radial distance "a" from the reference diameters 331 of the annulus gears 332A and 332B. The points H at which the flanges 333C and 333B are secured to the surrounding static structure 324A is the radial distance "a" from the reference diameter 331 of the annulus gears 332A and 332B to the axes of the apertures in the flanges 333C and 333B. The bolts 337A and 337B extend through corresponding apertures in flanges 325A and 325B respectively on the cylindrical member 324A and are threaded into respective nuts 339A and 339B.

Figure 9:
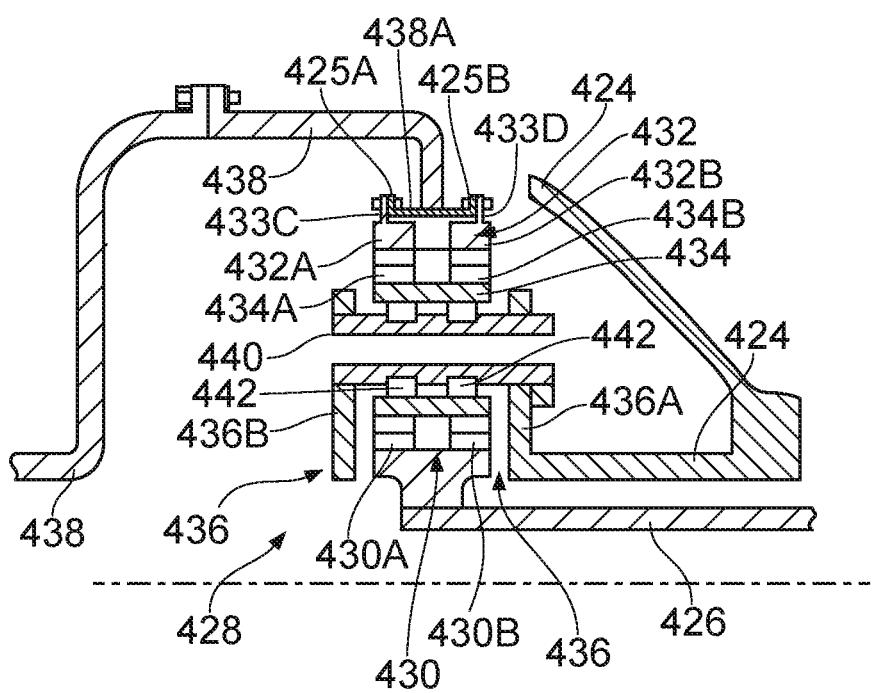
FIG. 9 is an enlarged cross-sectional view though an alternative gearbox according to the present disclosure.

FIG. 9, which is similar to FIG. 5, also shows an arrangement in which the low-pressure turbine 19 drives the fan 13 indirectly via the shaft 426, a gearbox 428 and a shaft 438. The gearbox 428 comprises a sun gear 430, an annulus gear 432, a plurality of planet gears 434 and a carrier 436. The sun gear 430 meshes with the planet gears 434 and the planet gears 434 mesh with the annulus gear 432. The carrier 436 enables each planet gear 434 to rotate about its own axis independently. The gearbox 428 shown in FIG. 9 is a star gearbox and the planet gears 434 are sometimes known as star gears. The carrier 436 is coupled to a static structure 424. The annulus gear 432 is coupled via the shaft 438 to the fan 13 in order to drive its rotation about the engine axis 9. The axes of the planet gears 434 are parallel to the engine axis 9. The shaft 438 is rotatably mounted in static structure by one or more bearings, e.g. rolling element bearings, e.g. roller bearings or ball bearings. The carrier 436 comprises a first ring 436A, a second ring 436B spaced axially from the first ring 436A and a plurality of circumferentially spaced axles, also known as pins, 440 which extend axially between the first ring 436A and the second ring 436B. Each planet gear 434 is rotatably mounted on a respective one of the axles 440. Each planet gear 434 is rotatably mounted in the carrier 436 by at least one bearing 442. In this particular embodiment each planet gear 434 is rotatably mounted on the carrier 436 by two rolling element bearings e.g. two roller bearings or two ball bearings 442. Alternatively each planet gear 434 may be rotatably mounted on the carrier 436 by a single rolling element bearing, e.g. a single roller bearing or a single ball bearing, or a journal bearing. Alternatively, the carrier 436 comprises the second ring 436B and the axles 440 and the axles 440 extend axially between the second ring 436B and the static structure 424.

The sun gear 430, the planet gears 434 and the annulus gear 432 are of the double helical design and have two sets of helical gear teeth, which are angled in opposite directions, e.g. a herringbone arrangement of helical gear teeth. The sun gear 430 comprises axially spaced sun gears 430A and 430B which have helical gear teeth angled in opposite directions. Each planet gear 434 comprises axially spaced planet gears 434A and 434B which have helical gear teeth angled in opposite directions. The annulus gear 432 comprises axially spaced annulus gears 432A and 432B which have helical gear teeth angled in opposite directions. The annulus gears 432A and 432B are arranged to be separate members arranged to be connected, or disconnected, from each other to enable the gearbox 428 to be assembled, or disassembled, by moving the annulus gears 432A and 432B axially in opposite directions while rotating the annulus gears 432A and 432B in opposite directions.

The annulus gears 432A and 432B are secured to a surrounding shaft 438 by respective radially extending members 433C and 433D. A face of the radially extending member 433C nearest the axial mid position of the annulus gear 432A is axially spaced from the middle, or axial mid position, of the annulus gear 432A by a first distance "b", the reference diameter of the annulus gear 432A is radially spaced from a point H at which the radially extending member 433C is secured to the surrounding shaft 438 by a second distance "a". Similarly, a face of the radially extending member 433D nearest the axial mid position of the annulus gear 432B is axially spaced from the middle, or axial mid position, of the annulus gear 432B by a first distance "b", the reference diameter of the annulus gear 432B is radially spaced from a point at which the radially extending member 433D is secured to the surrounding shaft 438 by a second distance "a". However, it is to be noted that the radially extending members 433C and 433D are axially spaced from their respective axial mid position in opposite directions because the forces $F_a$ acting on the annulus gears 432A and 432B are in opposite axial directions. Thus the axial distance between the radially extending members 433C and 433D is greater than the axial distance between the axial mid positions of the annulus gears 432A and 432B. The ratio of the first distance "b" to the second distance "a" is between and including 0.5 and 1.2. Preferably the ratio of the first distance "b" to the second distance "a" is between and including 0.51 and 1.19. Preferably the ratio of the first distance "b" to the second distance "a" is between and including 0.52 and 1.18. More preferably the ratio of the first distance "b" to the second distance "a" is between and including 0.53 and 1.17. More preferably the ratio of the first distance "b" to the second distance "a" is between and including 0.55 and 1.17. The ratio of the first distance "b" to the second distance "a" may be between and including 0.60 and 1.10. In addition the distances "a" and "b" for the annulus gear 432A are the same as the distances "a" and "b" for the annulus gear 432B.

The radially extending members 433C and 433D are flanges in this example. The flanges 433C and 433D are secured to an axially extending member, e.g. a cylindrical member, 438A of the surrounding shaft 438 by bolted connections. The flanges 433C and 433D each comprise a plurality of apertures for bolts of the bolted connections. The axes of the apertures are arranged at a radial distance "a" from the reference diameters of the annulus gears 432A and 432B. The points at which the flanges 433C and 433D are secured to the surrounding shaft 438 is the radial distance "a" from the reference diameters of the annulus gears 432A and 432B to the axes of the apertures in the flanges 433C and 433B. The bolts extend through corresponding apertures in flanges on the shaft 438 and are threaded into respective nuts.

Figure 10:
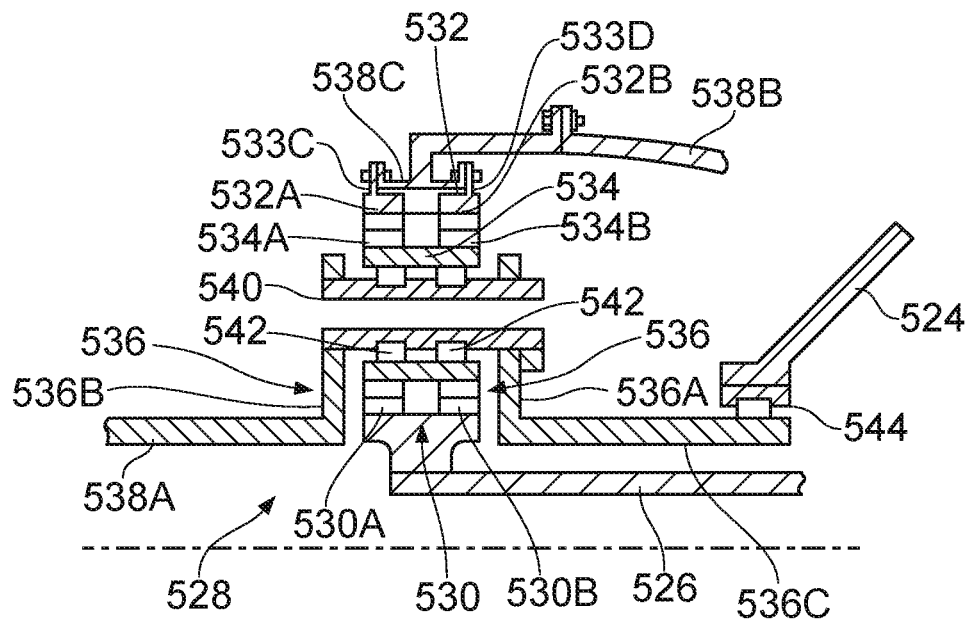
FIG. 10 is an enlarged cross-sectional view though a further gearbox according to the present disclosure.

FIG. 10, which is similar to FIG. 6, shows an arrangement in which the low-pressure turbine 19 drives two fans indirectly via the shaft 526, a gearbox 528 and shaft 538A and 538B. The gearbox 528 comprises a sun gear 530, an annulus gear 532, a plurality of planet gears 534 and a carrier 536. The sun gear 530 meshes with the planet gears 534 and the planet gears 534 mesh with the annulus gear 532. The carrier 536 enabling each planet gear 534 to rotate about its own axis independently. The gearbox 528 shown in FIG. 10 is a differential gearbox. The carrier 536 is coupled via the shaft 538A to a first propulsor (not shown) and the annulus gear 532 is coupled via the shaft 538B to a second propulsor (not shown) in order to drive their rotation about the engine axis 9. The shafts 538A and 538B are each rotatably mounted in static structure by one or more bearings, e.g. rolling element bearings, e.g. roller bearings or ball bearings. The propulsors are driven to rotate in opposite rotational directions. The axes of the planet gears 534 are parallel to the engine axis 9. The carrier 536 comprises a first ring 536A, a second ring 536B spaced axially from the first ring 536A and a plurality of circumferentially spaced axles 540 which extend axially between the first ring 536A and the second ring 536B. Each planet gear 534 is rotatably mounted on a respective one of the axles 540 and an annular extension 536C extends axially from the first ring 536A. Each planet gear 534 is rotatably mounted in the carrier 536 by at least one bearing 542. The annular extension 536C is rotatably mounted in the static structure 524 by a bearing 544. In this particular embodiment each planet gear 534 is rotatably mounted on the carrier 536 by two roller bearings 542. Alternatively each planet gear 534 may be rotatably mounted on the carrier 536 by a journal bearing.

The sun gear 530, the planet gears 534 and the annulus gear 532 are of the double helical design and have two sets of helical gear teeth, which are angled in opposite directions, e.g. a herringbone arrangement of helical gear teeth. The sun gear 530 comprises axially spaced sun gears 530A and 530B which have helical gear teeth angled in opposite directions. Each planet gear 434 comprises axially spaced planet gears 534A and 534B which have helical gear teeth angled in opposite directions. The annulus gear 532 comprises axially spaced annulus gears 532A and 532B which have helical gear teeth angled in opposite directions. The annulus gears 532A and 532B are arranged to be separate members arranged to be connected, or disconnected, from each other to enable the gearbox 528 to be assembled, or disassembled, by moving the annulus gears 532A and 532B axially in opposite directions while rotating the annulus gears 532A and 532B in opposite directions.

The annulus gears 532A and 532B are secured to a surrounding shaft 538B by respective radially extending members 533C and 533D. The flanges 533C and 533D are secured to an axially extending member, e.g. a cylindrical member, 538A of the surrounding shaft 538 by bolted connections. The annulus gears 532A and 532B are substantially the same as those described with reference to FIG. 9.

Figure 12:
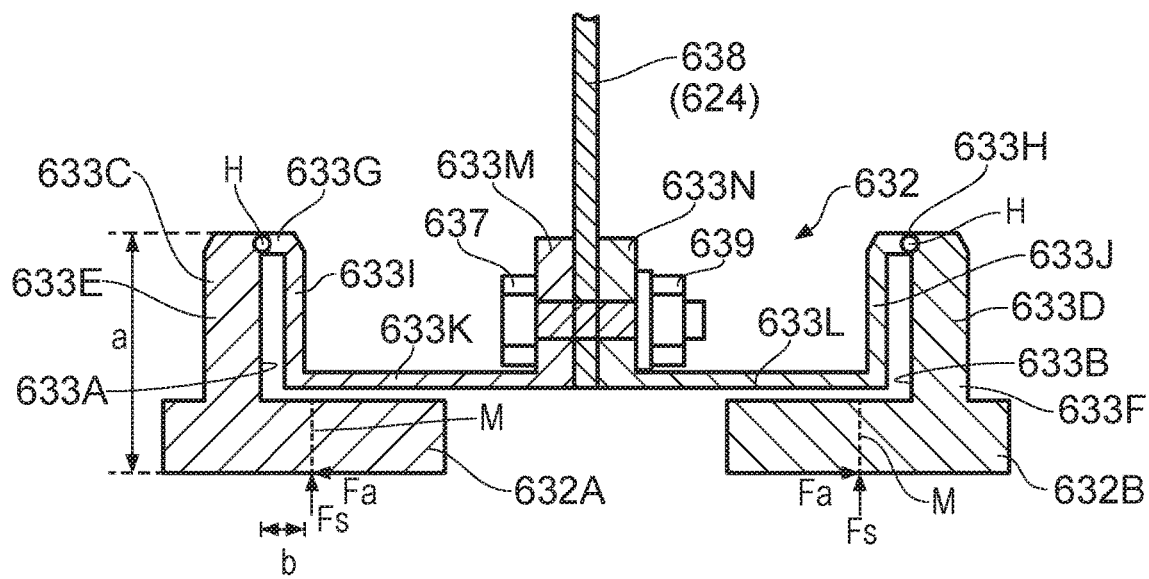
FIG. 12 is a further enlarged cross-sectional view of a portion of an alternative annulus gear and surrounding structure of the gearbox shown in FIGS. 8, 9 and 10.

FIG. 12 shows an alternative annulus gear 632 for use in the gearboxes shown in FIGS. 8, 9 and 10. The annulus gears 632A and 632B are manufactured by additive layer manufacturing, e.g. by direct laser deposition, laser powder bed deposition, electron beam powder deposition etc. The annulus gear 632A and 632B have substantially S-shaped members 633C and 633D extending therefrom. Each annulus gear 632A and 632B is integral with their respective S-shaped member 633C and 633D, e.g. the annulus gear 632A and the S-shaped member 633C is a single, monolithic, piece and the annulus gear 632B and the S-shaped member 633D is a single, monolithic, piece. Each S-shaped member 633C and 633D has respective first portions 633E and 633F, second portions 633G and 633H, third portions 633I and 633J, fourth portions 633K and 633L and fifth portions 633M and 633N. The first portions 633E and 633F extend radially from the annulus gear 632A and 632B. The third portions 633I and 633J and the fifth portions 633M and 633N also extend radially and are substantially parallel to their respective first portions 633E and 633F. The second portions 633G and 633H extend axially between the radially outer ends of their respective first portions 633E and 633F and the radially outer ends of their respective third portions 633I and 633J. The fourth portions 633K and 633L extend axially between the radially inner ends of their respective third portions 633I and 633J and the radially inner ends of their respective fifth portions 633M and 633N. The fifth portions 633M and 633N are secured to a radially extending member, e.g. a flange, of the surrounding static structure 624 or the surrounding shaft 638 by a bolted connection. The fifth portions 633M and 633N each comprise a plurality of apertures for bolts 637 of the bolted connection. The bolts 637 extend through corresponding aligned apertures in the fifth portions 633M and 633N and aligned apertures in the flange of the surrounding static structure 624 or the surrounding shaft 638 and are threaded into respective nuts 639. In this arrangement the hinges H are at the points of intersection between the first portions 633E and 633E and the second portions 633G and 633H of the respective S-shaped members 633C and 633D.

Figure 13:
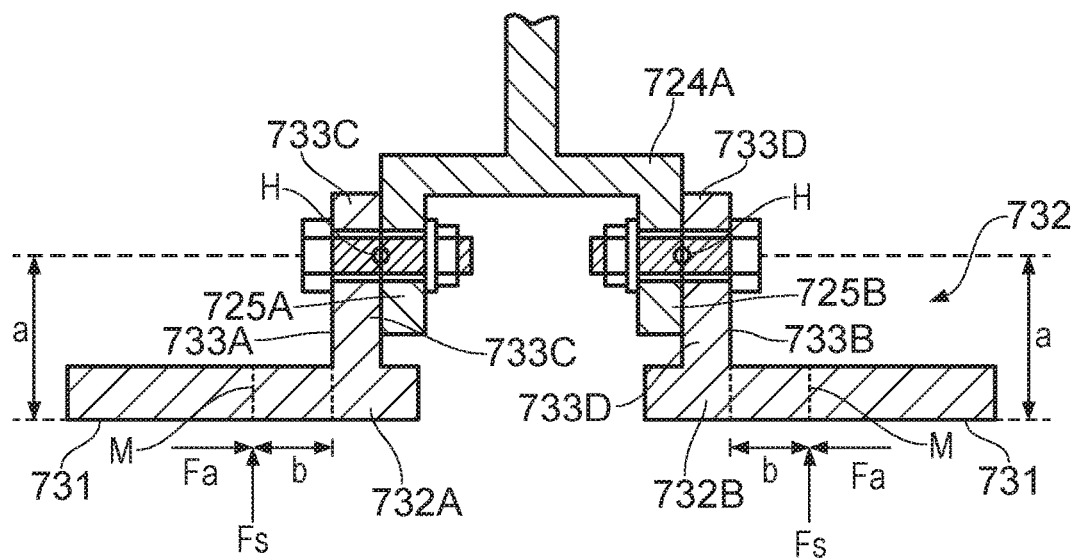
FIG. 13 is a further enlarged cross-sectional view of an alternative annulus gear and surrounding structure of the gearbox shown in FIGS. 8, 9 and 10.

FIG. 13 shows an alternative annulus gear 732 for use in the gearboxes used in FIGS. 8, 9 and 10. The annulus gears 732A and 732B are similar to those shown in FIGS. 8, 9 and 10, but the helical teeth on the annulus gear 732A are angled in the opposite direction to the helical teeth on the corresponding annulus gear in those gearboxes and similarly the helical teeth on the annulus gear 732B are angled in the opposite direction to the helical teeth on the corresponding annulus gear in those gearboxes. Similarly the helical teeth of the associated planet gears, or planet gears, and annulus gears must be angled in the opposite directions to those shown in FIGS. 8, 9 and 10. Thus the axial distance between the radially extending members 733C and 733D is greater than the axial distance between the axial mid positions M of the annulus gears 732A and 732B. The flanges 733C and 733D of the annulus gears 732A and 732B are secured to flanges 725A and 725B of a surrounding static structure, or surrounding shaft, 724A.

The damping arrangement described with reference to FIG. 7 may be used with both of the annulus gears of each of the gearboxes shown and described in FIGS. 8, 9, 10, 11, 12 and 13.

In each of the arrangements described above the sun gear, the annulus gear, the carrier and the shaft are coaxial.

In each of the arrangements described above the lubricant, e.g. oil, lubricates and cools the sun, annulus and planet gears and the bearings of the planet gears.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

Alternatively, the gas turbine engine comprises a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

Alternatively the gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine, a low-pressure turbine and a free power turbine, the high-pressure turbine is arranged to directly drive the high-pressure compressor, the low-pressure turbine is arranged to directly drive the low-pressure compressor and the free power turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine and a low-pressure turbine, the high-pressure turbine is arranged to directly drive the high-pressure compressor, the low-pressure turbine is arranged to directly drive the low-pressure compressor and the low-pressure turbine is arranged to drive the first propulsor and the second propulsor via a gearbox.

The sun gear may be driven by a low-pressure turbine, the annulus gear may be secured to static structure and the carrier may be arranged to drive a propulsor.

The sun gear may be driven by the low-pressure turbine, the carrier may be secured to static structure and the annulus gear may be arranged to drive a propulsor. In this arrangement each planet gear rotates about its own axis and the carrier does not rotate about the engine axis. The axes of the planet gears are parallel to the engine axis.

The carrier may be driven by the low-pressure turbine, the sun gear may be secured to static structure and the annulus gear may be arranged to drive a propulsor.

The sun gear may be driven by the low-pressure turbine, the carrier may be arranged to drive a first propulsor and the annulus gear may be arranged to drive a second propulsor.

Although the present disclosure has been described with reference to planetary gearbox, star gearbox and differential gearbox arrangements it is equally possible for the gearbox to be arranged in a solar gearbox arrangement, e.g. the sun gear is secured to static structure and either the carrier is driven by an input drive shaft and the annulus gear drives an output drive shaft or the annulus gear is driven by an input drive shaft and the carrier drives an output drive shaft.

The propulsor may be a fan or a propeller.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising a gearbox, the gearbox comprising:
   a sun gear, an annulus gear, a plurality of planet gears, and a carrier,
      each planet gear being rotatably mounted in the carrier by at least one bearing,
      the sun gear meshing with the planet gears and the planet gears meshing with the annulus gear,
      each of the sun gear, the planet gears, and the annulus gear comprising helical gear teeth, the helical gear teeth having a pressure angle and a helix angle,
      the annulus gear being secured to a surrounding structure by a radially extending member, a face of the radially extending member nearest a middle of the annulus gear being axially spaced from the middle of the annulus gear by a first distance, a reference diameter of the annulus gear being radially spaced from a point at which the radially extending member is secured to the surrounding structure by a second distance, wherein the first distance=(the second distance×sin(the helix angle of the helical gear teeth))/tan (the pressure angle of the helical gear teeth).

2. The gas turbine engine as claimed in claim 1, wherein a ratio of the first distance to the second distance is between and including 0.5 and 1.2.

3. The gas turbine engine as claimed in claim 2, wherein the ratio of the first distance to the second distance is between and including 0.55 and 1.17.

4. The gas turbine engine as claimed in claim 2, wherein the ratio of the first distance to the second distance is between and including 0.60 and 1.10.

5. The gas turbine engine as claimed in claim 1, wherein each planet gear is rotatably mounted on the carrier by a bearing, the bearing is selected from a group consisting of a journal bearing and at least one rolling element bearing.

6. The gas turbine engine as claimed in claim 1, wherein the carrier is connected to an output shaft and the surrounding structure is a static structure.

7. The gas turbine engine as claimed in claim 1, wherein the carrier is connected to a static structure and the surrounding structure is an output shaft.

8. The gas turbine engine as claimed in claim 1, wherein the carrier is connected to an output shaft and the surrounding structure is connected to the output shaft.

9. The gas turbine engine as claimed in claim 1, wherein the radially extending member is a flange.

10. The gas turbine engine as claimed in claim 9, wherein the flange is secured to the surrounding structure by a bolted connection.

11. The gas turbine engine as claimed in claim 10, wherein the flange comprises a plurality of apertures for bolts of the bolted connection, axes of the apertures being arranged at a radial distance from an inner surface of the annulus gear.

12. The gas turbine engines as claimed in claim 11, wherein a point at which the flange is secured to the surrounding structure is the radial distance from the inner surface of the annulus gear to the axes of the apertures in the flange.

13. The gas turbine engine as claimed in claim 1, further comprising a propulsor, an intermediate-pressure compressor, a high-pressure compressor, a high-pressure turbine, and a low-pressure turbine, wherein the high-pressure turbine is arranged to directly drive the high-pressure compressor, the low-pressure turbine is arranged to directly drive the intermediate-pressure compressor, and the low-pressure turbine is arranged to drive the propulsor via the gearbox.

14. The gas turbine engine as claimed in claim 13, wherein the sun gear is driven by the low-pressure turbine, the annulus gear is secured to a static structure, and the carrier is arranged to drive the propulsor.

15. The gas turbine engine as claimed in claim 13, wherein the sun gear is driven by the low-pressure turbine, the carrier is secured to a static structure, and the annulus gear is arranged to drive the propulsor.

16. The gas turbine engine as claimed in claim 1, further comprising a propulsor, an intermediate-pressure compressor, a high-pressure compressor, a high-pressure turbine, and a low-pressure turbine, wherein the high-pressure turbine is arranged to directly drive the high-pressure compressor, the low-pressure turbine is arranged to directly drive the propulsor, and the low-pressure turbine is arranged to drive the intermediate-pressure compressor via the gearbox.

17. The gas turbine engine as claimed in claim 1, further comprising a propulsor, an intermediate-pressure compressor, a high-pressure compressor, a high-pressure turbine, an intermediate-pressure turbine, and a low-pressure turbine, wherein the high-pressure turbine is arranged to directly drive the high-pressure compressor, the intermediate-pressure turbine is arranged to directly drive the intermediate-pressure compressor, and the low-pressure turbine is arranged to drive the propulsor via the gearbox.

18. The gas turbine engine as claimed in claim 1, further comprising a propulsor, a high-pressure compressor, a high-pressure turbine, and a low-pressure turbine, wherein the high-pressure turbine is arranged to directly drive the high-pressure compressor and the low-pressure turbine is arranged to drive the propulsor via the gearbox.

19. The gas turbine engine as claimed in claim 1, wherein each of the sun gear, the planet gears, and the annulus gear comprises two sets of helical gear teeth.

20. A gearbox comprising:
a sun gear, an annulus gear, a plurality of planet gears, and a carrier,
each planet gear being rotatably mounted in the carrier by at least one bearing,
the sun gear meshing with the planet gears and the planet gears meshing with the annulus gear,
each of the sun gear, the planet gears, and the annulus gear comprising helical gear teeth,
the annulus gear being secured to a surrounding structure by a radially extending member, a face of the radially extending member nearest a middle of the annulus gear being axially spaced from the middle of the annulus gear by a first distance, a reference diameter of the annulus gear being radially spaced from a point at which the radially extending member is secured to the surrounding structure by a second distance, wherein the first distance=(the second distance×sin(helix angle of the helical gear teeth))/tan (pressure angle of the helical gear teeth), and a ratio of the first distance to the second distance is between and including 0.5 and 1.2.

* * * * *